United States Patent
Tormey

(10) Patent No.: US 10,333,904 B2
(45) Date of Patent: Jun. 25, 2019

(54) VOICE ACCESS AND CONTROL

(71) Applicant: Peter J Tormey, Concord, CA (US)

(72) Inventor: Peter J Tormey, Concord, CA (US)

(73) Assignee: Peter J. Tormey, Concord, CA (US)

( * ) Notice: Subject to any disclaimer, the term of this patent is extended or adjusted under 35 U.S.C. 154(b) by 273 days.

(21) Appl. No.: 15/230,020

(22) Filed: Aug. 5, 2016

(65) Prior Publication Data

US 2017/0040018 A1 Feb. 9, 2017

Related U.S. Application Data

(60) Provisional application No. 62/202,812, filed on Aug. 8, 2015.

(51) Int. Cl.

| | |
|---|---|
| *H04L 29/06* | (2006.01) |
| *H04L 12/46* | (2006.01) |
| *G06F 21/62* | (2013.01) |
| *H04W 12/02* | (2009.01) |
| *H04W 84/12* | (2009.01) |
| *G10L 15/08* | (2006.01) |

(52) U.S. Cl.
CPC ...... *H04L 63/0428* (2013.01); *G06F 21/6245* (2013.01); *H04L 12/4633* (2013.01); *H04L 12/4641* (2013.01); *H04W 12/02* (2013.01); *G10L 2015/088* (2013.01); *H04W 84/12* (2013.01)

(58) Field of Classification Search
CPC ........... G10L 2015/088; H04L 63/0428; H04L 12/4633; H04L 12/4641; H04W 12/02; H04W 84/12; G06F 21/6245

See application file for complete search history.

(56) References Cited

U.S. PATENT DOCUMENTS

| | | | |
|---|---|---|---|
| 8,401,859 B2 | 3/2013 | Dhawan et al. | |
| 8,719,039 B1 | 5/2014 | Sharifi | |
| 9,058,805 B2* | 6/2015 | Aleksic | G10L 15/32 |
| 9,270,035 B2 | 2/2016 | Igoa et al. | |
| 9,280,973 B1* | 3/2016 | Soyannwo | G10L 15/30 |
| 9,305,064 B1* | 4/2016 | LeBeau | G06F 17/30755 |
| 9,390,708 B1* | 7/2016 | Hoffmeister | G10L 15/02 |
| 9,792,901 B1* | 10/2017 | Saleem | G10L 15/22 |
| 2010/0180754 A1* | 7/2010 | Brown | G10L 15/26 |
| | | | 84/610 |

(Continued)

*Primary Examiner* — Christopher C Harris
(74) *Attorney, Agent, or Firm* — Peter Tormey; Antero Tormey & Petrin, PC

(57) ABSTRACT

A system comprising a wireless entertainment system natively coupled through a network to a primary service provider for providing services, operates on multiple keywords to re-direct processing operations from the native service provider to additional, non-native services which may include online secure data, VPN, and/or VOIP. The system and method may employ sniffing, masking, and spoofing the communications and effectuating alternative communications channels transparent to the primary service provider. A private device includes code operable to transparently couple a remote device to a remote service provider, monitor a communication between the remote device and the remote service provider, and respond to the communications. Some embodiments may include a private service provider, a VPN connection and operations with a telephone service.

5 Claims, 2 Drawing Sheets

(56) References Cited

U.S. PATENT DOCUMENTS

| | | | |
|---|---|---|---|
| 2011/0054896 A1* | 3/2011 | Phillips | G10L 15/30 704/235 |
| 2012/0198339 A1* | 8/2012 | Williams | H04L 65/4092 715/727 |
| 2014/0081633 A1* | 3/2014 | Badaskar | G06F 17/30023 704/235 |
| 2014/0278435 A1* | 9/2014 | Ganong, III | G10L 15/22 704/275 |
| 2015/0058447 A1* | 2/2015 | Albisu | H04L 67/02 709/219 |
| 2016/0267913 A1* | 9/2016 | Kim | G10L 15/22 |

\* cited by examiner

VOICE ACCESS AND CONTROL

PRIORITY

This application claims the benefit of provisional patent application 62/202,812, entitled "Voice Access and Control" by the same inventor, filed Aug. 8, 2015 which is incorporated by reference, together with its appendix, as if fully set forth herein.

BACKGROUND

Conventional wireless entertainment systems may employ speakers, microphones and processing equipment effect wireless connectivity to the Internet. The systems may include wireless connectivity such as WiFi, Bluetooth and the like. These conventional wireless entertainment systems may operate as front-ends for web services such as streaming audio, music, books, video and other digital content. In certain cases, these devices act as voice command devices as well, wherein a user can ask for certain content that will be played over the device. A keyword (or attention word) may be employed to indicate to the system that a voice command follows. For example, and without limitation, Amazon's ECHO may be spoken to using the keyword "Alexa" followed by a command "play music." The audio signal would be digitized, in whole or in part, for transmission over a network. The device would then contact a remote service, or voice platform, and those services would respond with streaming music. A certain element of interoperability may be included wherein the remote device or web service will ask for clarification of the command. For example, and without limitation, "What music would you like?" The system will then play that music. Speech recognition applications are well-known conventionally and may be included in the entertainment systems, accessed remotely, or in combination. However, conventional wireless entertainment system lack rugged security.

Data security in computing systems has always been one of the more difficult challenges both for users and for service providers. At each step of processing computer data, from creation, storage, and transmission, there is a risk of a security compromise. The results of a compromise could be tragic. Conventional online systems such as AMAZON, GOOGLE, and the like often mine data from users to maximize revenues by classifying users by potential buying categories, so massive amounts of personal data are available in online facilities.

Encryption is also used to protect data in transit, for example and without limitation, data being transferred via networks (e.g. the Internet, e-commerce), mobile telephones, wireless microphones, wireless intercom systems, Bluetooth devices and bank automatic teller machines. However, because data in transit may be intercepted it is often encrypted to secure it because it is difficult to physically secure all networks.

Encryption, by itself, can protect the confidentiality of messages, but other techniques are still needed to protect the integrity and authenticity of a message; for example and without limitation, preventing certain users from knowing about message traffic and avoiding web services that collect user data.

SUMMARY

Disclosed herein is a system comprising a processor and memory, wirelessly coupled to a network. A remote device and a remote service provider are coupled to the network and coupled to a processor and a software engine including code operable to transparently couple a remote device to a remote service provider, monitor a communication between the remote device and the remote service provider, and respond to the communication. Some embodiments may include a private service provider, a VPN connection, which encapsulated encrypted messages, and operations with a telephone service.

The disclosure herein provides new means of operability for a wireless entertainment system by expanding the capabilities of the system and providing for secure communication channels through private networks. The present disclosure provides for additional secure operations because the wireless entertainment system is freed from reliance on a single, native service provider, but instead may employ any number of alternative service providers.

The construction and method of operation of the invention, however, together with additional objectives and advantages thereof will be best understood from the following description of specific embodiments when read in connection with the accompanying drawings.

DESCRIPTION

Generality of Invention

Figure 1:
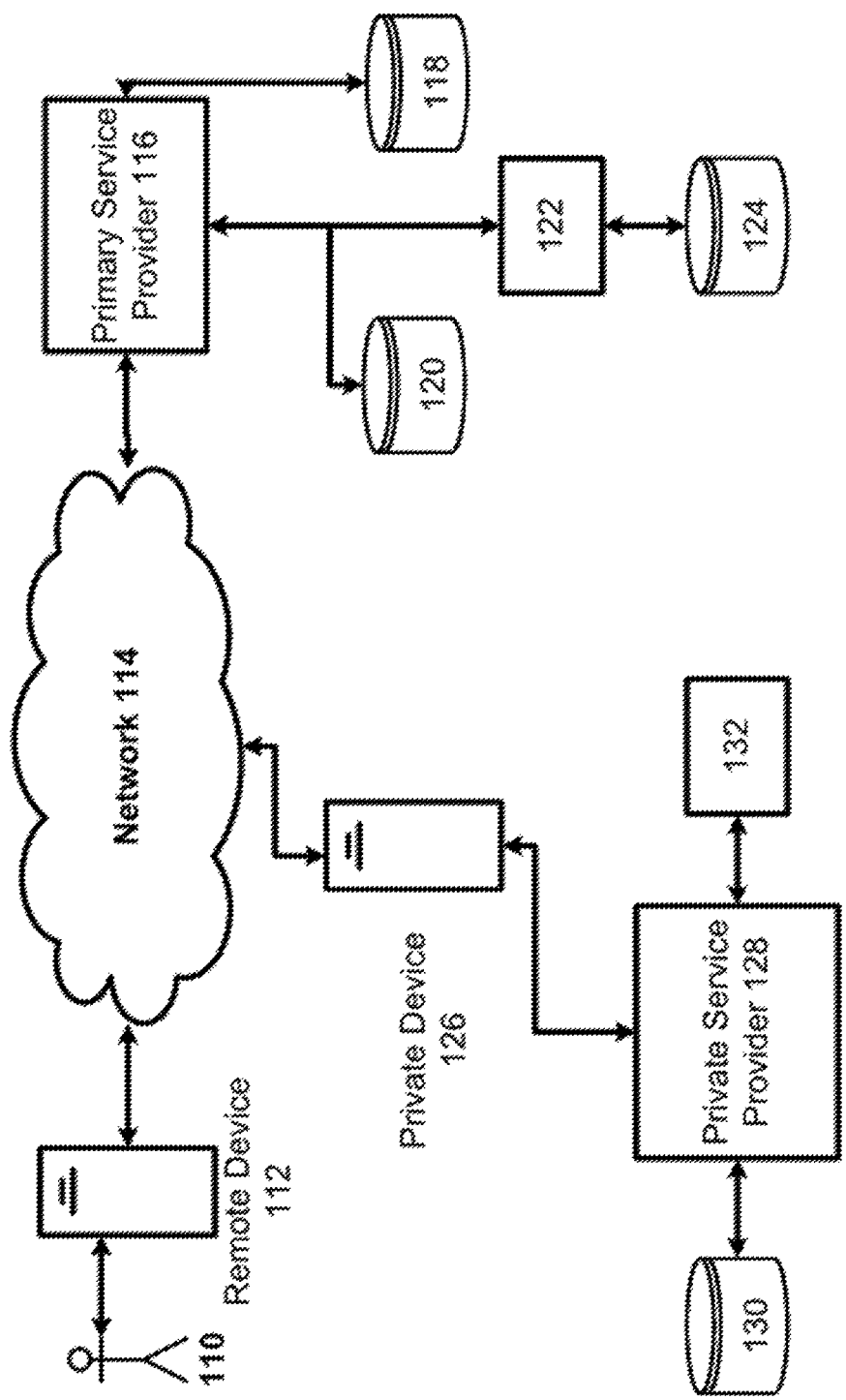
FIG. 1 shows a first embodiment according to the current disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Lexicography

The term "application programming interface" or "API" generally refers to a code-based specification intended to be used as an interface by software components to communicate with each other. An API may include specifications for routines, data structures, object classes, and variables.

The terms "cipher" or "cipher" generally refers to an algorithm for performing encryption or decryption.

The term "coupled" generally means communicably coupled whether directly using hard wired communications or through a wireless interface or network.

The terms "data payload" or "payload" generally refer to information in a data packet that is not conventionally in the header or footer and does not conventionally pertain to routing information for the packet. Payload information may be encrypted.

The term "declarative language" generally refers to a programming language that allows programming by defining the boundary conditions and constraints and letting the computer determine a solution that meets these requirements. Many languages applying this style attempt to minimize or eliminate side effects by describing what the program should accomplish, rather than describing how to go about accomplishing it. This is in contrast with imperative programming, which requires an explicitly provided algorithm.

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The terms "header" and footer" generally refer to parts of a data packet that include control information such as routing, VPN information, sender information, routing information, protocol information, and the like.

The term "HTML Injection" generally refers to injecting HTML code into a web server's response to alter the content to the end user. This is also known as cross site scripting.

The term "extension" and "browser extension" and the like generally refer to a computer program, applet or instructions that extend the functionality of a web browser in some way. Depending on the browser, the term may be distinct from similar terms such as plug-in or add-on.

The term "encryption" generally refers to the process of transforming information (referred to as plaintext) using an algorithm (called a cipher) to make it unreadable to anyone except those possessing special knowledge, usually referred to as a key. The result of the process is encrypted information (or ciphertext). The reverse process, making the encrypted information readable again, is generally referred to as decryption. The word encryption may also refer to the reverse process as well. For example, "software for encryption" often performs decryption.

The word "Middleware" generally means computer software that connects software components or applications. The software consists of a set of enabling services that allow multiple processes running on one or more machines to interact across a network. Middleware conventionally provides for interoperability in support of complex, distributed applications. It often includes web servers, application servers, and similar tools that support application development and delivery such as XML, SOAP, and service-oriented architecture.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example, and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The term "service level agreement" (SLA) generally means an agreement between providers for Internet based computing resources such as servers, databases, and data storage systems and clients. SLAs generally contain details about what services are available, pricing for those services and availability for those resources. SLAs may also include workload, queue size, disk space availability, CPU load, network latency, or business metrics such as cost or location.

The terms "sniffing," packet analyzing, or "packet sniffing" generally refer to computer instructions (program) or hardware that can intercept and log traffic that passes over a digital network or part of a network. As data streams flow across the network, the sniffer captures each packet and, if needed, decodes the packet's address and/or payload, showing the values of various fields in the packet, and analyzes its content according to the appropriate instructions or specifications.

The terms "software as a service" or "SaaS" or "on-demand software" generally mean a software delivery model in which software and its associated data are hosted centrally such as on the Internet or cloud and accessed by users using a client. SaaS is a common delivery model for many business applications, including accounting, collaboration, customer relationship management (CRM), management information systems (MIS), enterprise resource planning (ERP), invoicing, human resource management (HRM), content management (CM) and service desk management.

The term "source data" generally means to provide data operations such as execute queries, read data, write data and the like.

The terms "spoofing," "IP address spoofing," and IP spoofing generally refers to the creation of Internet Protocol (IP) packets with a forged source IP address, with the purpose of concealing the identity of the sender or impersonating another computing system.

The term "structured data" generally refers to data stored in a meaningful fashion such that a processor may be instructed to access the data. Examples include but are not limited to databases, relational databases, text files, XML file and the like.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "wireless device" generally refers to an electronic device having communication capability using radio, optics and the like.

The term "wireless entertainment system" generally means a device including a speaker, microphone and wireless transceiver operable to communicate over a network for providing music, news and other audio information using voice control.

The term "virtual machine" or "VM" generally refers to a self-contained operating environment that behaves as if it is a separate computer even though it is part of a separate computer or may be virtualized using resources form multiple computers.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

System Elements

Conventional wireless systems may employ a remote device which includes speakers, microphones and processing equipment to operate those speakers and microphones. In addition, the systems may include wireless connectivity such as WiFi, Bluetooth and the like. One non-limiting example is AMAZON's ECHO system. The ECHO system includes both Bluetooth and WiFi communications capabilities allowing for the ECHO system to connect through an access point to Amazon's server for voice control operations including streaming audio.

These conventional wireless entertainment systems may operate as front-ends for web services such as streaming audio, music, books, video and other digital content. In certain cases these devices act as voice command devices as well, wherein a user can ask for certain content that will be played over the device. A keyword (or attention word) may be employed to indicate to the system that a voice command follows. For example and without limitation, Amazon's ECHO may be spoken to using the keyword "Alexa" followed by a command "play music." The device would then contact a remote service and play music. A certain element of interoperability may be included wherein the remote device or web service will ask for clarification of the command. For example and without limitation, "What music would you like?" The system will then play that music.

Different services may be provided through a system as described above. For example audible books, weather, news, sports and the like may be available from different web service providers. Speech recognition may be performed at the remote device or by transmitting raw audio to a server which in turn converts the audio to recognizable commands, words or sentences. For example, and without limitation, voice translation services such as GOOGLE translate and the like will receive audio, convert it to text and return the text for further processing.

Parallel Operation

FIG. 1 shows an embodiment of a system according to the current disclosure. In FIG. 1 a user 110 connects to a remote device 112. The remote device may be a wireless entertainment system that includes audio capabilities, processor capabilities and wireless network capabilities. The remote device 112 is connected to a network 114 such as the Internet. Network connection may be effectuated through an access point (not shown). Coupled to the network 114 is a primary service provider 116 which, in turn is coupled to secondary services providers 120, 118 and 122. Secondary service provider 122 is coupled to a tertiary service provider 124.

FIG. 1 also shows a private device 126 which is coupled to the remote device 112 and other network devices. This coupling may be wireless such as WiFi, Bluetooth and the like or may be physically connected. The private device 126 is operable for monitoring communications between the remote device 112 and the primary service provider 116.

The private device 126 is coupled to a private service provider 128 which, in turn, is coupled to other service providers 130 and 132. The private device 126 may include processors, processor instructions, microphones, speakers and the like for performing local operations such as speech recognition. Moreover, the private device 126 may access services, including speech recognition, from the private service provider 128. The private service provider 128 may also be coupled to the network 114 (not shown).

In operation, the user 110 provides a voice command to the remote device 112 which is forwarded by the remote device 112 to the primary service provider 116. The voice command may be digitized audio or recognized text from speech recognition processing on the remote device 112. In some embodiments the voice command may be encrypted. This encryption may be standard Internet protocols such as SSL or may include advanced encryption or "tunneling" wherein the content is encrypted before applying traditional security operations. In keeping with the examples presented herein, the voice command may be "Alexa, play music." This digitized command, and in some embodiments the keyword, would be coupled to the primary service provider 116 for processing and any response would be directed towards the remote device 112 for presentation to the user 110 or other system operations.

In the example above the private device 126 is monitoring communications (sniffing) between the remote device 112 and the primary service provider 116. The private device 126 may then operate on those communications. For example and without limitation, a user asks for music from a specific artist. If the primary service provider 116 returns an indication that music from that artist is not available, then the private device 126 may connect with the private service provider 128 to locate that music and provide it to the remote device 112. This may be effectuated by spoofing the primary service provider 116 such that the remote device 112 receives and processes the music request without awareness of its source. In addition, the private service provider 126 may act on voice command in parallel with the Primary service provider 116 and provide information back to the remote device 112 or to another device coupled to the network 114.

Listening and spoofing are conventional network operations and commercial tools are available to effectuate such procedures. The private device 126 may also operate in parallel by accessing the music (or other request) and playing the requested audio through its own audio system.

Certain embodiments may allow for the private device 126 to connect to wireless speakers (not shown).

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Series Operation

Figure 2:
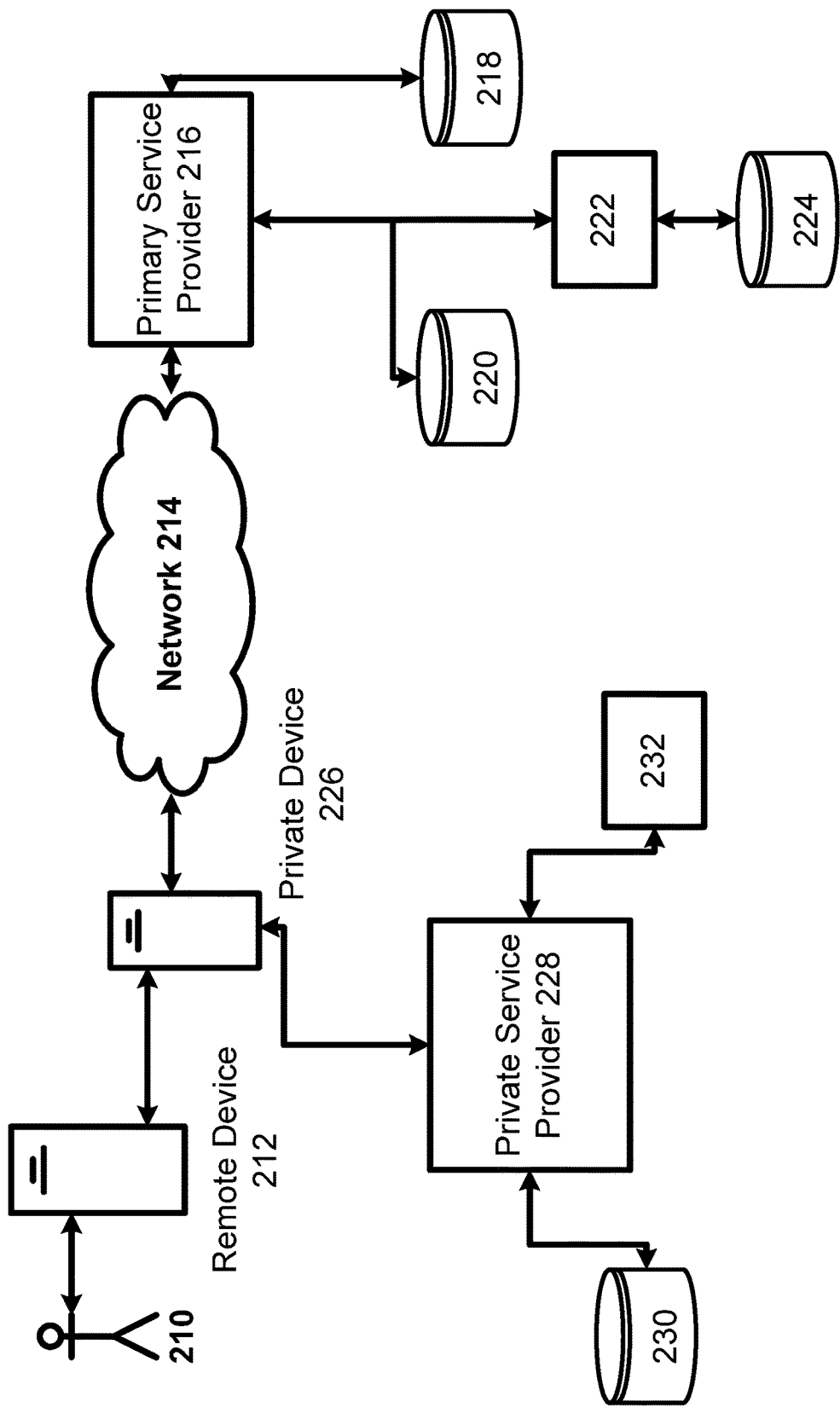
FIG. 2 shows a second embodiment according to the current disclosure.

FIG. 2 is another embodiment according to certain aspects of the current disclosure. In FIG. 2 a user 210 is coupled to a remote device 212. The remote device may be a wireless entertainment system and include audio capabilities, processor capabilities and wireless network capabilities. The remote device 212 is connected to a private device 226, which in turn is connected to a network 214 such as the Internet. The private device 226 functions as a repeater because it relays information from the remote device 212 to other devices either through the network 214 or directly. A private service provider 228 is coupled to the private device 228, and in certain embodiments this coupling may be through a network as well. Network connections may be effectuated through an access point (not shown) or the private device 226 may operate as an access point or repeater. Coupled to the network 214 is a primary service provider 216 which, in turn is coupled to secondary services providers 220, 218 and 222. Secondary service provider 222 is coupled to a tertiary service provider 224.

A repeater, according to one embodiment, may consist of the following components: A high-gain or a low-gain antenna system, a transceiver, a circuit that detects the strongest signal or channel, amplifies it, and repeats it and associated processing and memory. The repeater is operable to detect and lock to the strongest channel or signal available from a router and communicate with the router. It then repeats this signal. If this signal is not the desired signal, the device locks into the next available channel under the user's command. Accordingly, a WiFi repeater performs the function of coupling the remote device 212 to an access point and, consequently to the Internet, thus receiving and transmitting all communications to and from the remote device 212. In other embodiments, the repeater ran be programmed by the user to only repeat a desired channel, or to only communicate with predetermined stations.

FIG. 2 also shows the private device 226 coupled to the remote device 212, a private service provider 228 and to the network 214. This coupling may be wireless such as WiFi, Bluetooth and the like or may be physically connected. The private device 226 is operable for monitoring communications between the remote device 212 and the primary service provider 216. In addition, the private device 226 may act as a repeater for communications between the private device 212 and the primary service provider 216 such that data and information passing between the two devices is first received by the private device 226 and then forwarded to the appropriate destination. Conventional electronics such as the Raspberry Pi processor using a 2.4 GHz and 5 GHz Wi-Fi adapter may be programmed to provide this functionality by handling each packet repeated. The repeating process may be transparent to the primary service provider 216 and the remote device 212.

In one operation a user 210 provides a voice command to the remote device 212 and the command is forwarded through the private device 226 to the primary service provider 216 which, in turn, provides a response to the private device 226 which, in turn, forwards it to the remote device 212. Some embodiments provide for the private device 226 to alter commands from the remote device 212 before forwarding them to the primary service provider 216. For example and without limitation, a voice command may be "Alexa, play music for me" which might be altered by the private device to "Alexa, play jazz music for me" before forwarding to the primary service provider 216. The response would be repeated by the private device 226 before forwarding to the remote device 212.

In some embodiments, the private device 226 may pre-empt certain requests. For example, and without limitation, a command to play music might be serviced directly by the private service provider 228 using resources 230 and 232 coupled to the private service provider 228. The resources 230 and 232 may be other private devices coupled to other wireless entertainment systems. Moreover, voice commands may direct which service provider services the request. For example and without limitation, the private service provider 228 may respond to a different name than "Alexa" thus indicating the use of the alternative service provider.

To provide operations using native operations on the remote device 212 and primary service provider 216, an additional (or secondary) keyword may be used. For example and without limitation, if the remote device only responds to "Alexa" then a multi-part voice command may redirect. Instead of "Alexa, play music." a user might say "Alexa, my device, play music." which would allow for a device like an ECHO to respond to the request by sending it to the private device 226 using its native operation wherein the private device 226 would recognize the secondary keyword "my device" and service the request using resources without communicating with the primary service provider 216. This may be effectuated by sniffing the keywords "Alexa" and "my device" to redirect traffic from the primary service provider 216 to the private service provider 228, such that the primary service provider 216 has no indication of the communication. The sniffing may, in certain embodiments, only need to encompass the first part of the communication because the keywords are positioned at the beginning of the audio phrase. Communications may proceed between the private service provider 228 and the remote device 212 until redirected, which may be effectuated using keywords or when a process provided by the private service provider 228 is completed.

Some embodiments may include multiple secondary keywords. For example and without limitation the following:

"Call"—would direct the private device to access telephony operations and make calls into telephone systems. For example "Alexa, call 911" would direct the private device 226 to access local phone services, call 9-1-1 and use the speaker and microphone (Input/Output) of the remote device 212 to effectuate the emergency call.

"Call Pat"—would direct the private device to contact another user of a VOIP system (Pat) and initiate a call which would use the I/O capabilities of the remote device 212.

"Private call"—would direct the private device 226 to establish a secure channel to another device, for example and without limitation, a virtual private network (VPN) connection with another user accessible locally or over the network 214. To effectuate a private call, the private device may connect to existing software as a service (SaaS) providers such as SKYPE or it may couple to another device similar to the private device 226, thus effectuating secure communications between the two stations.

"Dictate"—would direct the private device 226 to access word processing operations for voice dictation and editing of documents.

"Email"—would direct the private device 226 to access email processing operations for voice dictation, editing, reading, sending and other communication operations. Likewise "SMS" may be used for text messaging operations.

"Search"—would direct the private device 226 to access a search engine for searching of web sites and audio processing the results.

"Wiki"—would direct the private device 226 to access an online encyclopedia such as Wikipedia for searching for information and audio processing the results.

One advantage of the use of a private device 226 and a private service provider 226 is that confidentiality may be maintained because the primary service provider 216 may not provide secure communications whereas the private service provider 228 may. Many different secondary keywords, operating in tandem, may be effectuated to provide a wide range of results including stringing keywords together in tandem.

SaaS providers provide task-specific software, for example and without limitation word processing, spreadsheets, financial software, file management and the like. The SaaS providers have a data store 230 attached to them which is conventionally used for storing data used in the operation of their software. In conventional operation the SaaS provider provides the software to a user using a browser or other thin-client application. The user then operates the software. In certain embodiments SaaS providers may provide services through voice translations or in native audio. The SaaS provider stores the results of the operation in the SaaS data store 230. For example, and without limitation, the SaaS provider might store documents, spreadsheets, financial statements, other software, or data used in the operation of the SaaS to be read over a voice channel.

Certain embodiments include a system comprising a processor, a memory coupled to said processor and a network coupled to said processor. This embodiment may also include a wireless communication transceiver coupled to the processor and a software engine including code operable to transparently couple a remote device to a remote service provider, monitor a communication between the remote device and the remote service provider, and respond to the communication by changing the communications channel to a different service provider in response to audio keywords. The communications may include accessing a private service provider, a public telephone system or secure communications using a virtual private network.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A device including:
   a processer coupled to a memory;
   a WiFi transceiver coupled to the processor, said transceiver operable to wirelessly couple to an entertainment system on a first channel and to a network on a second channel;
   processor-readable instructions encoded on said memory directing the processor to perform a method comprising:
   receiving from the transceiver, a digitized audio information;
   analyzing at least a portion of the digitized audio information to determine the presence of a keyword;
   relaying the digitized audio information to either a primary service provider or to a secondary service provider, in response to the presence of the keyword;
   receiving a response information from the secondary service provider;
   altering the response information to spoof the primary service provider, and transmitting the altered response information to the entertainment system.

2. The device of claim 1 wherein said analyzing encompasses only a first portion of the digitized audio information.

3. The device of claim 1 wherein the method further includes: encrypting the digitized audio information in response to the presence of the keyword, and encapsulating the encrypted digitized audio information for transmission to a virtual private network.

4. The device of claim 1 wherein the method further includes:
   analyzing the portion of the digitized audio information to determine the presence of a second keyword, and directing the digitized audio information to the secondary service provider, in response to the presence of the second keyword.

5. The device of claim 4 wherein the method further includes:
   encapsulating the digitized audio information for transmission to a virtual private network.

* * * * *